United States Patent
Tehranchi (10) Patent No.: US 7,242,772 B1
(45) Date of Patent: Jul. 10, 2007

(54) ENCRYPTION APPARATUS AND METHOD FOR SYNCHRONIZING MULTIPLE ENCRYPTION KEYS WITH A DATA STREAM

(75) Inventor: Babak Tehranchi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1279 days.

(21) Appl. No.: 09/656,634

(22) Filed: Sep. 7, 2000

(51) Int. Cl.
*H04N 7/167* (2006.01)
*H04L 9/00* (2006.01)

(52) U.S. Cl. .................................... 380/223; 380/280

(58) Field of Classification Search ............... 380/260, 380/223, 280, 200
See application file for complete search history.

(56) References Cited

U.S. PATENT DOCUMENTS

| | | | |
|---|---|---|---|
| 3,962,539 A | 6/1976 | Ehrsam et al. | |
| 4,200,770 A | 4/1980 | Hellman et al. | |
| 4,405,829 A | 9/1983 | Rivest et al. | |
| 5,185,796 A | 2/1993 | Wilson | |
| 5,438,622 A | 8/1995 | Normile et al. | |
| 5,621,799 A | 4/1997 | Katta et al. | |
| 5,774,546 A * | 6/1998 | Handelman et al. ........ | 380/227 |
| 5,959,717 A * | 9/1999 | Chaum ..................... | 352/40 |
| 5,963,909 A * | 10/1999 | Warren et al. .............. | 705/1 |
| 5,974,144 A | 10/1999 | Brandman | |
| 6,016,348 A | 1/2000 | Blatter et al. | |
| 6,021,199 A | 2/2000 | Ishibashi | |
| 6,021,391 A | 2/2000 | Shyu | |
| 6,028,932 A | 2/2000 | Park | |
| 6,052,466 A | 4/2000 | Wright | |
| 6,137,763 A * | 10/2000 | Dahan et al. ................ | 369/95 |
| 6,141,530 A * | 10/2000 | Rabowsky ................. | 725/116 |
| 6,345,101 B1 * | 2/2002 | Shukla ...................... | 380/210 |
| 6,735,311 B1 * | 5/2004 | Rump et al. ............... | 380/231 |

FOREIGN PATENT DOCUMENTS

| EP | GB 2 264 373 A | 8/1993 |
|---|---|---|
| EP | 0 676 897 A | 10/1995 |

OTHER PUBLICATIONS

Bruce Schneier, Applied Cryptography, 1996, John Wiley & Sons, Inc, pp. 272-273.*

* cited by examiner

*Primary Examiner*—Gilberto Barrón, Jr.
*Assistant Examiner*—Benjamin E. Lanier
(74) *Attorney, Agent, or Firm*—Norman Rushefsky (57) ABSTRACT

A data stream, such as a digital motion picture, is encrypted in units of one or more blocks, each block having an assigned encryption key. A plurality of encryption keys is assigned to the complete data stream, with a synchronization index provided to map each individual encryption key to its starting data block. Encryption keys and associated synchronization indices are provided separately from the data stream, using one or more additional data transfer mechanisms. An optional offset, randomly generated, allows variation in intervals between data blocks at which encryption by a specific encryption key can be performed.

39 Claims, 5 Drawing Sheets

ENCRYPTION APPARATUS AND METHOD FOR SYNCHRONIZING MULTIPLE ENCRYPTION KEYS WITH A DATA STREAM

FIELD OF THE INVENTION

This invention generally relates to an apparatus and method for encrypting and decrypting a data stream as a plurality of sequential data blocks, each block having an assigned encryption key and more particularly relates to an apparatus and method for securely synchronizing each encryption key with a corresponding data block.

BACKGROUND OF THE INVENTION

In order to take advantage of expanding utilities for transmission or transfer of a data stream, such as can be provided by high-capacity portable storage devices and by high-speed data transmission channels, users who need mass data transfer capabilities require that a high degree of security be provided. Security measures help to prevent such activities as tampering with data, eavesdropping, and data piracy.

Data piracy can be particularly damaging for providers of entertainment that is transmitted as a data stream, such as providers of TV and video programs and providers of digital motion pictures. Unless stringent security measures are followed, digital contents of such copyrighted materials could be illegally copied and distributed, resulting in the loss of substantial investment to the rightful owners. The need for data security is becoming more acute as the digital motion picture industry evolves. Conventional methods for distributing film copies to local theaters are expected to change as motion pictures are prepared and distributed digitally. Whether distributed using transmission by satellite or cable or over dedicated, high-speed phone lines, or distributed using a portable, high-capacity storage medium such as DVD device, it is anticipated that digitization of motion picture material will begin to replace current film-based distribution. This development presents substantial potential risks to the entertainment industry that must be countered with security measures so that only qualified sites have access to the entertainment material.

Digitization of motion picture images presents special challenges for ensuring data security. One aspect of the security problem is file size. A digitized, full-length feature film can be of the order of a few terabytes of data, before compression. Even with advanced data compression techniques, the amount of data for a standard movie is substantial. Because of the amount of data, and because of the risks in allowing a decrypted or unencrypted copy to be available for access, there are advantages to high-speed or real-time decryption techniques that would provide rapid decryption of a digital data stream for movie projection or viewing (and also allow time for data decompression).

For maximum security, an ideal goal would be to have video data, motion image data or motion picture data (also interchangeably referred to herein as digital motion image data and applicable to digital movies or motion pictures, whether to be viewed on TV or at motion picture theaters or on the computer) encrypted under all conditions, even during film editing and preparation processes. In this way, wherever the motion picture would be handled or transmitted, from initial filming and editing stages through viewing at the theater, the digital data for the motion picture would not be available in plaintext (unencrypted) form. At the same time, however, any encryption scheme would need to allow access to one or more individual frames, such as for editing purposes.

An important aspect of the security problem is the need to distribute a motion picture, as a digital data stream, to thousands of sites within the same time period. This means that solutions for data encryption/decryption, compression/decompression, and overall distribution must be robust. These solutions must also allow for the "staggered showtime" arrangements used by many theaters and must be capable of handling difficulties such as equipment problems that might require restarting or pausing momentarily, again requiring individual frame addressability and re-synchronization of a decryption scheme. As used herein the term encryption involves transforming data in order to conceal its meaning and is thus distinguishable from other well-known encodings such as compression and image processing used to affect color size or density of the image.

Considering the size of files for video and digital motion pictures, conventional encryption approaches are not well-suited to the difficult task of maintaining encryption security while, at the same time, allowing individual frame access. For example, the simple approach of encrypting a digital motion picture as a single block makes operations such as individual frame editing, fast-forward operations, staggered display, and related frame-based activity difficult to support or infeasible. Thus, the approach of parsing the data into blocks makes sense; however, if the same encryption key applies to each block, system security may not be adequate. Therefore, it is recognized that a flexible solution for encoding data in discrete blocks that still provides data security is needed.

It is instructive to observe that, at a base level, encryption algorithms themselves require handling of plaintext data (that is, data that is to be encrypted to form ciphertext data) in discrete blocks. For example, DES encryption operates on a 64-bit unit of data at a time. Encryption methods may re-use the same key for each encryption or may use different keys for different data blocks. Using multiple keys, as will be described subsequently, allows advantages by more securely encrypting the data.

As an overview, there are two general types of encryption schemes:

(1) Private or symmetric encryption. Symmetric algorithms use the same key for encryption and decryption. Anyone who has possession of the private key can decrypt the data. The National Bureau of Standards Data Encoding Standard (DES), as disclosed in U.S. Pat. No. 3,962,539 (Ehrsam et al.) is a well-known example of a symmetric encryption scheme.

(2) Public, or asymmetric encryption. Asymmetric algorithms use different keys for encryption and decryption. Data is encrypted using a public key, accessible to anyone. However, data can only be decrypted by someone who holds a private key. RSA, as disclosed in U.S. Pat. No. 4,405,829 (Rivest et al.) is a well known public key encryption scheme.

In general, symmetric encryption is faster than asymmetric and thus is a more likely candidate for motion picture encryption and encryption/decryption for similar data streams. However, a drawback with symmetric encryption is the requirement that a symmetric key must be securely distributed to each intended recipient. The risk of allowing unintended access to other recipients must be minimized.

There are a number of conventional solutions for distribution and management of keys used for decryption of large files. For example, it is known to take advantage of the strengths of both symmetric and asymmetric algorithms for this purpose, first using asymmetric encryption to distribute a symmetric key or keys, then using these keys for fast decryption. A key is a series of bits or a number that is required in order to decrypt the encrypted data A conventional solution for efficient decryption of a sizable data stream is to provide multiple keys, where keys are mapped to identified blocks in the data stream. As an example of one key management approach used for a stream cipher, U.S. Pat. No. 6,052,466 (Wright) discloses the use of multiple private keys for encryption when negotiating a key exchange for a public key encryption scheme. A sequence of identical private keys is generated at both sending and receiving sites, based on initial key generation information transferred using public key methods. To synchronize keys to the data stream, each member of the sequence of generated keys is indexed to a predetermined, fixed location on a page within the data stream. Re-synchronization is thereby provided in the event of data packet loss. While the direct key-to-page mapping scheme used in the Wright patent has advantages for reducing problems due to packet loss and re-synchronization, no attempt is disclosed to provide any measure of security by requiring rearrangement of keys or manipulation of page boundaries. The method disclosed in the Wright patent also has other inherent disadvantages for secure data transfer such as is required for digital motion pictures. For instance, index information for using the keys is encoded within the ciphertext message itself, rather than provided separately. In addition, the same communication channel is used for key exchange and ciphertext data transmission. This use of the same channel means that anyone who can access the communication channel has access to the encrypted data as well as to the information needed for decryption.

Similarly, for a radio communications channel, U.S. Pat. No. 5,185,796 (Wilson) discloses providing encryption key information interleaved with the transmitted data, a security scheme optimized to allow re-synchronization in the event of signal loss. Keys themselves are not transmitted, however, but are stored at sending and receiving sites. Methods such as those disclosed in U.S. Pat. Nos. 6,052,466 and 5,185,796 are suitable for some types of data transfer applications. With respect to delivery or transmission of digital motion picture information, however, these methods do not provide the most advantageous solutions. For maximum data security and for overall decryption speed, it is preferable to provide both keys or key generation data and key indexing and synchronization information separately from the data stream. When multiple keys are used with motion picture and video data, some correspondence between the encryption of data in blocks and the individual motion picture or video frames (not addressed in the above-mentioned disclosures) would be advantageous, as is described subsequently.

As an example of handling data in blocks, U.S. Pat. No. 6,021,391 (Shyu) discloses a method for encryption of a data stream by handling individual data segments of arbitrary length. Each individual data segment can then be separately encrypted, using a separate key and algorithm, which are specified in a segment header that is part of the data stream. Here again, the encryption key and encryption algorithm are identified in the data stream itself, which can be viewed as a disadvantage when contrasted with a strategy of providing an encryption key separately. For the same reasons discussed above, clear identification of a data segment header may be useful in some applications, but may be disadvantageous for a data stream representing video or audio data, such as in a motion picture application.

Other solutions have been proposed to make encryption of a data stream more efficient or more secure. Among examples of key management and usage solutions for efficient reusability of a symmetric key is U.S. Pat. No. 5,438,622 (Normile et al.) which discloses a method for providing an offset value that can be encrypted by a transmitted system and then used to specify a "deferred" starting point within a key for encryption/decryption. The key itself is generated from a secret key and an initialization vector. Given the offset value, a decryption processor can use that portion of the key indicated by the offset value for decryption. This method makes it difficult for an unauthorized listener to decode repeated patterns, since a variable offset value can be applied to the same key multiple times, effectively changing the key, since different parts of the key are used with each encryption. It is instructive to note that, with this method, the offset value is applied to the key that is generated in a transmitter/receiver, requiring that a substantial portion of the generated key be discarded with each encryption/decryption operation. Moreover, since some portion of the key may be the same with each encryption operation, it is less likely that this method is more secure than simply providing a different key altogether.

As an example in which blocks of video data are encrypted, U.S. Pat. No. 6,021,199 (Ishibashi) discloses a method for encryption of an MPEG 2 video data stream. MPEG 2 (a standard of the Motion Picture Experts Group) stores video data as a series of frames, for which an I-frame serves as a reference frame. Other MPEG frames (P- and B-dependent frames) require reference to an I-frame (an intra-coded stand alone frame) in order to be correctly interpreted. In the Ishibashi patent, only these essential I-frames of the data stream are encrypted, which effectively precludes use of any of the other video data in the data stream until decryption of the I-frames is performed. While this method has merit, it can be objected that frame boundaries would remain obvious in the ciphertext data stream, which is a disadvantage from a data security perspective. It would be most advantageous to mask any defining frame header or synchronization character within the ciphertext data stream and to securely encrypt all data in the data stream. Notably, the overall security of this method relies on encryption of I-frames only. While this selective encryption simplifies the effort and minimizes the time required for encryption, it has a disadvantage, since unauthorized decryption of a single I-frame would allow access to other P- and B-frames as well.

Copy protection schemes for distribution of recorded media do not suggest satisfactory solutions to the requirements for secure storage and distribution of motion picture data and other data streams. Schemes such as are disclosed in U.S. Pat. No. 6,028,932 (Park) or U.S. Pat. No. 5,963,909 (Warren et al.), for example, disable or constrain playback or copying but are impractical for digital motion picture applications since they require some advance knowledge of the specific destination hardware. Pay-per-view schemes, such as is disclosed in U.S. Pat. No. 6,016,348 (Blatter et al.) provide decryption codes for conditional access to video programming using an insertable ISO 7816-3 compliant smart card; however, this arrangement is limited to providing data access and algorithm identification.

Thus, it can be seen that while conventional approaches address some of the needs for secure encryption and for distribution and synchronization of encryption keys provided to receiver sites, existing methods do not provide data encryption solutions that are well-suited to the security requirements for high-volume, data stream distribution, such as is needed by providers of digital motion pictures. Moreover, conventional methods are not well-suited to the specific requirements for frame-by-frame access of a digital motion picture data stream that allows editing, restart, and fast-forward functions. Therefore, there is a need for a secure encryption apparatus and method for synchronizing multiple encryption keys with individual blocks in a data stream, where the apparatus and method are readily adaptable to digital motion picture applications.

SUMMARY OF THE INVENTION

It is an object of the present invention to provide an apparatus and method for encrypting a data stream as a plurality of sequential data blocks, each block having an assigned encryption key and for providing a secure method for synchronizing each encryption key with a corresponding data block.

The present invention provides a data transfer apparatus for secure transfer, from a digital data source to a digital data receiver, of a plurality of data blocks, the apparatus comprising:

(a) an encryption key generator capable of providing, for each single data block, an encryption key assigned to each said single data block and a block synchronization index indicating a correspondence between said encryption key and said single data block;

(b) an encryption engine that, for each said single data block, performs an encryption process using said encryption key from said encryption key generator;

(c) a data transmission channel for delivering said encrypted data block from said encryption engine to the digital data receiver;

(d) a key transmission channel for delivering said encryption key from said encryption key generator to the digital data receiver;

(e) a block synchronization data channel for delivering said block synchronization index from said encryption key generator to the digital data receiver.

Another feature of the present invention is the indexing of each one of a plurality of encryption keys to a corresponding block of data, with a variable offset relative to each block of data.

The present invention also provides a flexible arrangement for selecting a block size to be encrypted. This, in turn, allows selection of a variable number of encryption keys to be applied to a data stream. Maximizing the number of encryption keys can help to obtain the highest level of security for the data. At the same time, distribution methods may constrain the number of encryption keys that can be provided.

In accordance with a further aspect of the present invention is provided a method for generating a random offset for the beginning of a data block, thereby frustrating efforts to determine block boundaries and to determine precisely at which point in the data stream the next encryption key is to be applied.

A further advantage of the present invention is that it provides an efficient method for minimizing the size of overhead data needed for encryption keys, thus allowing a large number of encryption keys to be easily distributed, either by transmission or by recording onto a removable storage medium.

A further advantage of the present invention is that, when applied for secure encryption and transmittal of a digital motion picture, it provides an encryption method that allows access to individual frames, so that only that portion of the digital motion picture data stream that is being edited or viewed must be decrypted at any one time.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

It must be noted that the following detailed description is primarily directed to use of an encryption apparatus for providing secure digital motion picture transmission and storage. While this use represents a preferred embodiment of the present invention, it can be readily appreciated by one skilled in the data encryption and data transfer arts that the present invention is applicable more broadly, particularly to any use where large amounts of data must be securely transferred from a distribution site to one or more recipient sites. The term "data stream" is used with its conventional meaning, to encompass any type of high-volume data transfer. In the context of this application, a data stream has sufficient size such that the complete unit of data to be transferred must be encrypted in multiple blocks, using either the same key for each block or using an arrangement where a plurality of keys is used to encrypt a plurality of blocks.

Figure 1:
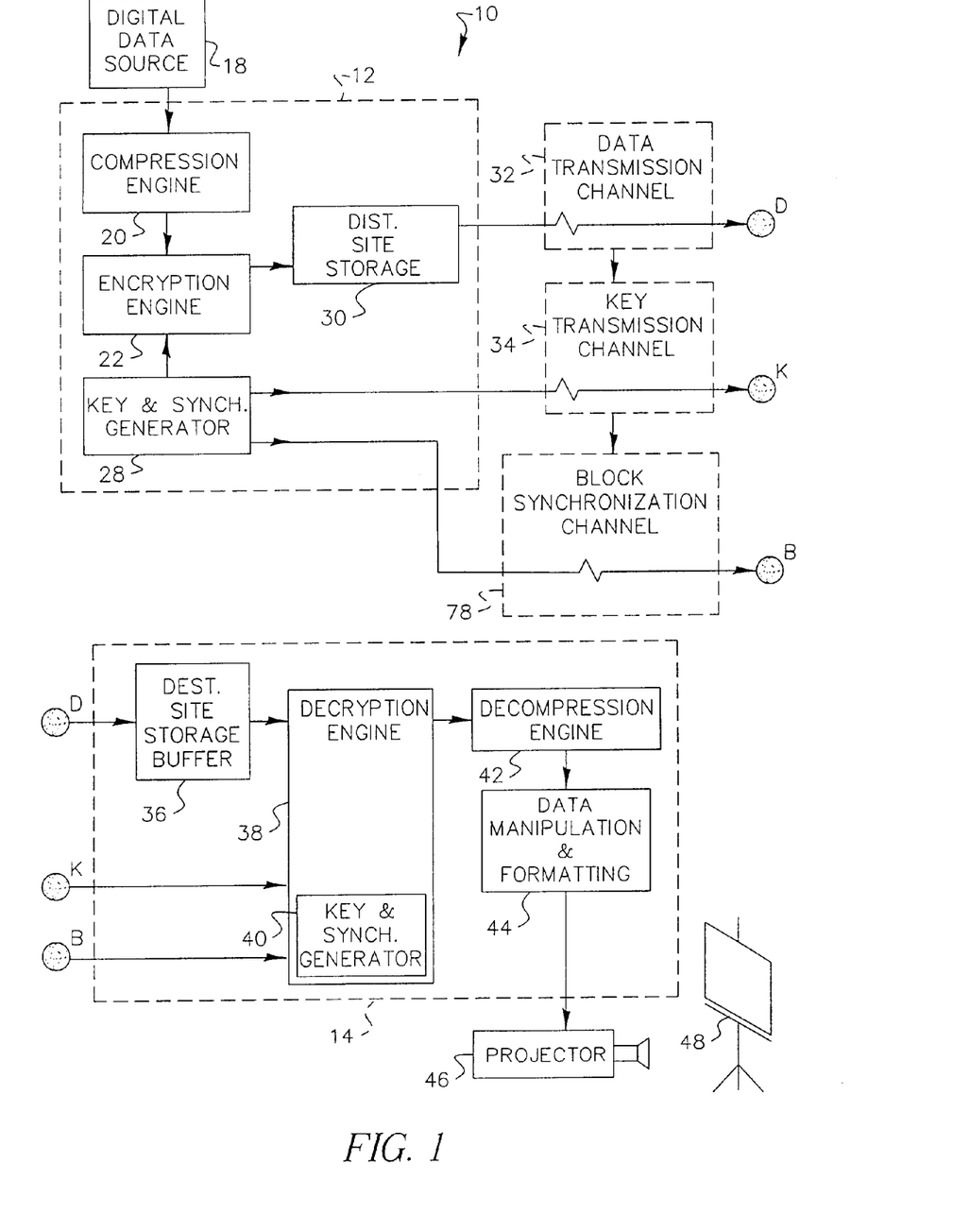
FIG. 1 shows a schematic view of an apparatus for secure transfer of a data stream used in a digital motion picture application in accordance with the invention.

Referring to FIG. 1 there is shown a secure data stream transfer apparatus, generally numbered 10, for secure transfer of a data stream from a data origination site 12 to a data destination site 14. A digital data source 18, which could be any of a number of devices that provide digital data output, provides the source data stream. For example, digital data source 18 could comprise a telecine apparatus that scans a film as input and provides digital data as output. Digital data source 18 could alternately comprise a digital camera that provides data without requiring an intermediary telecine device. Digital data source 18 could alternately comprise a high-capacity storage medium, such as a bank of hard disks (for example, a RAID array). Digital data source 18 formats the input data stream as is appropriate for the specific application.

A compression engine 20 then takes the input data stream and applies compression algorithms. For digital motion picture data, for example, the input data stream may be compressed as MPEG-2 data. MPEG-2 video data is stored in frames, with each frame having three color components: Y, Cr, Cb. (It is instructive to note that other data formats, such as JPEG or JPEG-2000, are available for digital motion picture representation, with MPEG-2 or a variant MPEG-2 format being a likely candidate as an industry standard.) Although compression of the motion picture data is preferred the data need not be compressed.

The resulting compressed data stream then goes to an encryption engine 22. Compression engine 20 and encryption engine 22 can be fully or partially implemented in hardware or might be implemented using a high-speed computer workstation equipped with appropriate software, the development of which would be well within the skill of the art after reading of this specification.

Figure 2:
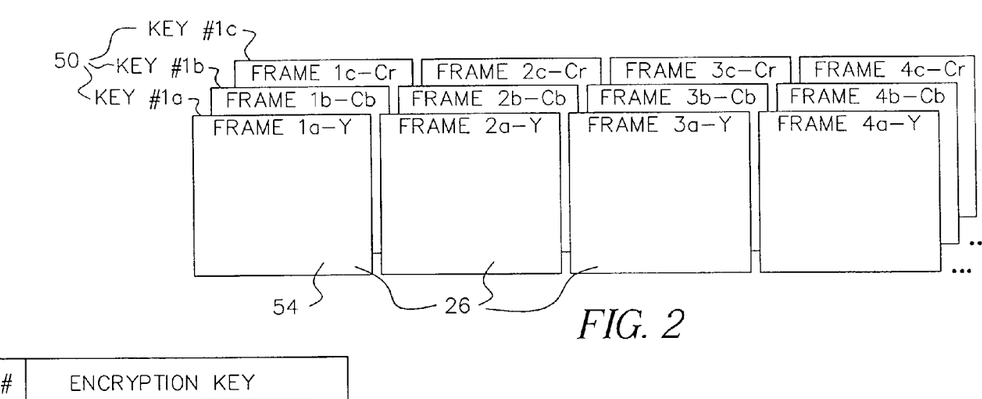
FIG. 2 is a schematic view showing key assignment to individual components of frames for a digital motion picture in accordance with the invention.
Figure 4:
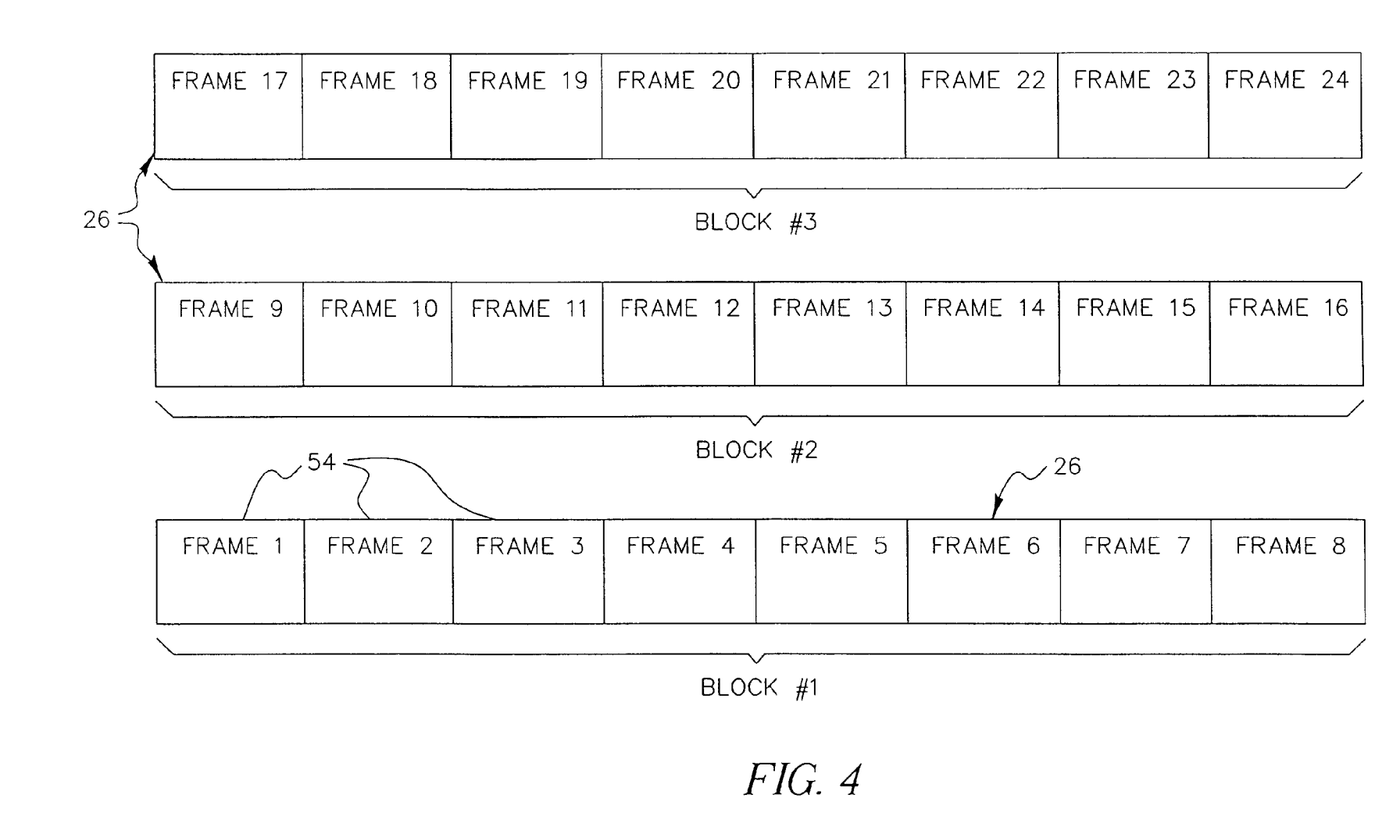
FIG. 4 is a schematic view showing key assignment to multiple frames within a block of frames for a digital motion picture in accordance with the invention.

A key and synchronization generator 28 provides encryption engine 22 with an encryption key 50 for each data block 26, as is represented in FIGS. 2 and 4. As will be described subsequently, encryption engine 22 can size data block 26 to be encrypted appropriately for the security requirements of the users of secure data stream transfer apparatus 10. Thus, one or more encryption keys 50 will be required for encryption engine 22. Key and synchronization generator 28 also generates a synchronization index that associates each generated encryption key 50 with its corresponding data block(s) 26. The nature of the synchronization index generated, and possible embodiments for a synchronization index, will be described subsequently.

Encryption engine 22 may temporarily store completed encrypted data blocks 26 in a distribution site storage apparatus 30, which can be a high-capacity storage device or, more generally, any suitable storage apparatus or memory buffer. The completed data stream, as compressed ciphertext possibly stored or buffered in storage apparatus 30, is then available for distribution to data destination site 14 using a data transmission channel 32. Data transmission channel 32 can be broadly understood to encompass a number of possible data transfer mechanisms. For example, data transmission channel 32 could be a dedicated, high-speed phone line. Alternately, data transmission channel 32 could comprise a wireless transmission channel for transfer of data using RF, microwave, or satellite transmission. Data transmission channel 32 could comprise a computer data network, local area network (LAN) or wide-area network (WAN). As yet another alternative, data transmission channel 32 could use a high-capacity storage medium, such as a DVD or other optical disk that is shipped to data destination site 14. (In FIG. 1, letter D indicates the connection of data transmission channel 32 between sites 12 and 14.)

A key transmission channel 34 is provided in order to allow a separate mechanism for transfer of data from key and synchronization generator 28. Key transmission channel 34 can be broadly understood to encompass a number of possible data transfer mechanisms. For example, key transmission channel 34 could comprise a phone line or network, or comprise a wireless transmission channel for transfer of key data using RF, microwave, or satellite transmission. Alternately, key transmission channel 34 could use a portable storage medium, such as a smart card, diskette, CD-ROM, or other storage device. Unlike data transmission channel 32, which requires a relatively high bandwidth transmission channel or storage device, key transmission channel 34 may only need to transfer data on the order of a few Kbytes. (In FIG. 1, letter K indicates the connection of key transmission channel 34 between sites 12 and 14.)

A block synchronization transmission channel 78 is provided in order to allow a separate mechanism for transfer of block synchronization indices that map each encryption key 50 to a specific data block 26. For example, block synchronization transmission channel 78 could comprise a phone line or comprise a wireless transmission channel for transfer of block synchronization data using RF, microwave, or satellite transmission. Alternately, block synchronization channel 78 could use a portable storage medium, such as a smart card, diskette, CD-ROM, or other storage device. Unlike data transmission channel 32, which requires a relatively high bandwidth transmission channel or storage device, block synchronization channel 78 may only need to transfer data on the order of a few Kbytes. (In FIG. 1, letter B indicates the connection of block synchronization channel 78 between sites 12 and 14.) It should be noted that a single transmission channel or storage device may serve for both block synchronization channel 78 and key transmission channel 34.

As is represented in FIG. 1, data destination site 14 is capable of accepting the ciphertext data stream by means of data transmission channel 32, the key data by means of key transmission channel 34, and block synchronization data by means of block synchronization channel 78. The ciphertext data stream may be buffered by a destination site storage buffer 36 which can be any of a number of storage or memory devices, depending on the configuration of data transmission channel 32. For example, destination site storage buffer 36 could comprise a high-capacity storage device or, if data is provided on DVD or optical disk, a disk drive. The ciphertext data stream from buffer 36 is input to a decryption engine 38, typically a processor embodied as a proprietary hardware device, that provides a compressed plaintext data stream output. Decryption engine 38 could be a component of projector 46, for example. A destination key and synchronization generator 40 takes input data from key transmission channel 34 and block synchronization channel 78 and, as output, provides the necessary encryption key and synchronization data for decryption engine 38. A decompression engine 42 provides any necessary data decompression for the plaintext data stream. For a digital motion picture application, a data manipulation and formatting apparatus 44 may provide further image processing functions such as color correction and image resizing in accordance with well known algorithms. In order to limit the accessibility of plaintext motion picture data at destination site 14, data manipulation and formatting apparatus 44 may be implemented as a component of projector 46 which projects images represented by the video data upon a screen.

Note that FIG. 1 illustrates only the components along the path of the digital data stream that are most relevant to the present invention. It is to be understood that numerous other components and processes may be applied to a digital data stream, depending on the data content and use requirements. For example, added data security can be provided for key transmission channel 34 and for block synchronization transmission channel 78 by encrypting data sent on these channels.

Encryption Key 50 Mapping

In general, where there are multiple keys 50 assigned to a series of multiple data blocks 26, some form of mapping mechanism is needed. A synchronization index of some type, whether explicitly given (such as using an identifying name or number) or implicitly given (such as using relative position within a data file or data stream), is used to provide the information needed to link a data block with its corresponding key 50.

Referring to FIG. 2, there is shown one possible mapping of encryption keys 50 to data blocks 26. Data blocks 26 can be of any arbitrary size; however, for the purposes of this disclosure for digital motion picture encryption, each data block 26 could correspond to an individual compressed frame 54. Further, as is represented in FIG. 2, each data block 26 could correspond to an individual color separation (Y, Cr, or Cb component) where a frame 54 comprises three separations (as in a JPEG-2000 compressed frame). With such an arrangement, an individual key 50 could be assigned to each color separation within each frame 54, as is shown for Keys #1a, #1b, and #1c in FIG. 2. This arrangement could necessitate the construction and maintenance of a key mapping table 52 or array as shown in FIG. 3, which indexes an encryption key 50 to each frame 54 component.

Figure 3:
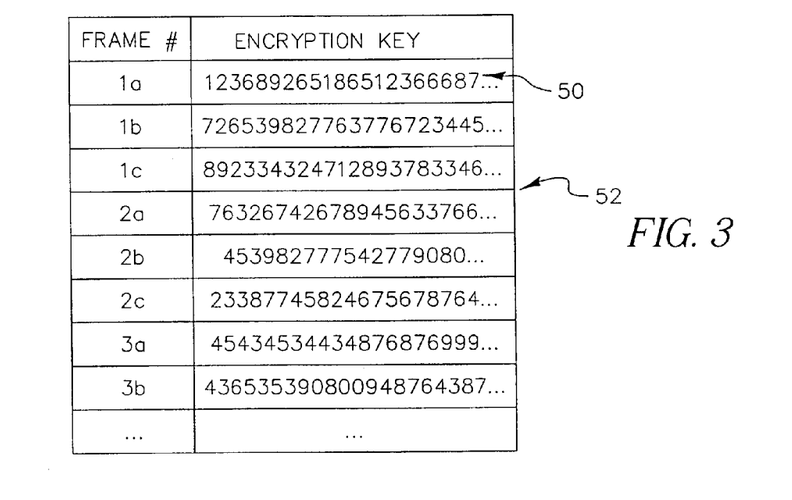
FIG. 3 represents an example of a basic key assignment table listing frame components and corresponding keys for a digital motion picture in accordance with the invention.
Figure 9:
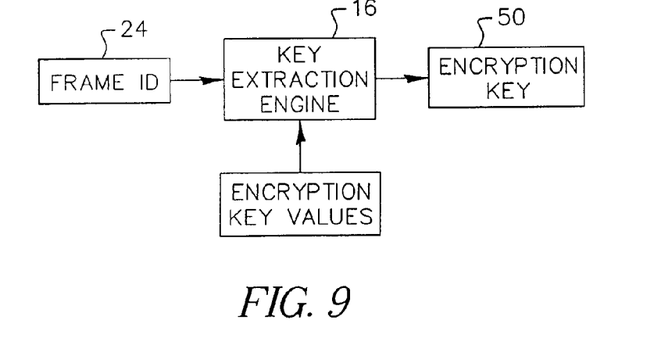

It is an object of the present invention to provide substantially the same functional capability for encryption/decryption of individual frames 54 as is depicted in FIG. 3. Referring now to FIG. 9, there is shown a schematic block diagram of a process executed by key and synchronization generators 28 and 40 for generation of encryption key 50 given a data stream having where it is necessary to access a specified frame 54. In this process, a key extraction engine 16 accepts a frame or frame component ID 24 and encryption key values (which may be simply a sequential listing of encryption keys 50, possibly padded (with dummy bits), interleaved, or scrambled in some manner) and provides as output the corresponding key 50 for the specific frame 54. Key extraction engine 16 may use a mathematical or logical process in order to generate a unique key 50 for each block 26. With a process as shown in FIG. 9, mapping of keys 50 to blocks 26 (and, correspondingly, to individual frames 54 or even to individual frame 54 components) could be accomplished using some form of explicit synchronization index associated with the block 26 or frame 54. Or, in a simple case, a synchronization index could be implicit in the position of frame 54 within the data stream (for example, assigning the 537$^{th}$ key to the 537$^{th}$ frame). Or, for added security in encrypting the data stream, some type of proprietary algorithm could be used to provide an implicit synchronization indexing function, mapping a specific block 26 or frame 54 to its corresponding key 50.

FIGS. 2 and 3 represent a fairly extreme case, requiring a substantial number of keys 50. It can readily be appreciated that there would be advantages in an alternate method in which each encryption key 50 is assigned to a block 26 comprising multiple frames 54, as is shown in FIG. 4. In the example of FIG. 4, eight frames 54 are combined into a single block 26. With the arrangement of FIG. 4, each block 26 has a single corresponding encryption key 50. In the preferred embodiment, each frame 54 within block 26 is separately encrypted using the encryption key 50 assigned to block 26. Using the example of FIG. 4, it can readily be seen that key mapping table 52 could use a Block number as synchronization index (instead of Frame #, as was shown in FIG. 3) and could be thereby substantially reduced in size.

Figure 5:
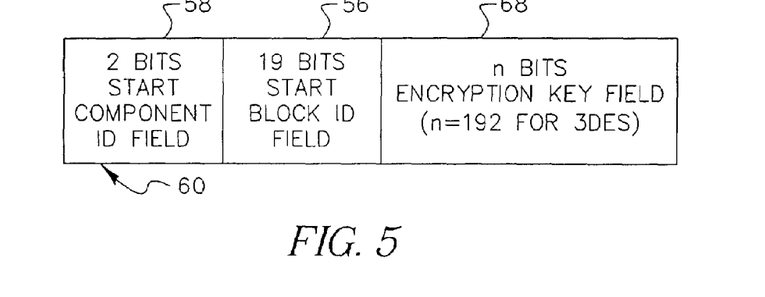
FIG. 5 shows an example of a shortened encryption key assignment structure for a single key in accordance with the invention.

It can be appreciated that there are advantages in reducing the overall amount of data that must be provided for keys 50 and their associated synchronization indexes while, at the same time, providing as many keys 50 as is feasible. Referring to FIG. 5, there is shown an alternative data structure 60 that can be employed as the basic structure within key mapping table 52 to reduce the storage requirements from those using the arrangement shown in FIG. 4. The arrangement of FIG. 5 would be most useful with an implementation that uses an arbitrary size (in terms of number of frames) for block 26. Using the arrangement of FIG. 5, an encryption key 50 is mapped to a starting frame 54. A start block ID field 56 and a start component ID field 58 provide, in 21 bits, mapping information for a frame 54 at which a specific encryption key 50 is first used. The same encryption key 50 can then be used for subsequent frames 54 until the next subsequent frame 54 is identified by a subsequent data structure 60. With this arrangement, the table of FIG. 3 could have variable size, with one data structure 60 for every key 50 used. In the structure of FIG. 5, start block ID field 56 acts as an explicit synchronization index.

Based on the arrangement of keys 50 and synchronization indices shown in FIG. 5, Table 1 compares relative number of data bytes required to store encryption key 50 values and synchronization index data using different block 26 sizes, for a movie that is 130 minutes in length and uses 30 frames per second. This means encrypting the following total number of frames 54:

(130 min./movie)×(60 sec./min.)×(30 frames/sec.)
=234,000 frames per movie

The "Overhead per Key" column of Table 1 shows the number of bits required to provide a synchronization index for each frame 54. In an extreme case (with 234,000 frames), a total of 18 bits would be sufficient for this mapping (since $2^{18}$=262,144). To make this scheme applicable for longer motion pictures, therefore, 19 bits would suffice. An additional 2 bits would be used to identify the component of frame 54 to which a key 50 applies, as in the following example.

| Bit pattern: | Interpretation |
| --- | --- |
| 00 | Encryption key 50 used for all components (Y, Cb, Cr) of frame 54 |
| 01 | Encryption key 50 used for Luma component, Y |
| 10 | Encryption key 50 used for Cr component |
| 11 | Encryption key 50 used for Cb component |

Sizes in Table 1 are listed by algorithm, using standard DES (which can be broken with substantial computational time and effort) or the Triple-DES algorithm (which has not yet been broken as of the date of filing of this application).

TABLE 1

Comparison of Required Number of Bytes for Key 50 Data Storage

| Encryption Algorithm | Max. Key Length (bits) | Overhead per Key (bits) | Required Bytes of Key Storage, 1 Key per Block 26, with Block 26 size of: | | | |
|---|---|---|---|---|---|---|
| | | | 1 Frame component (Y, Cr, Cb) | 1 Frame | 10 Frames | 30 Frames |
| DES | 64 | 21 | 7,458,750 | 2,486,250 | 248,625 | 82,875 |
| Triple-DES | 192 | 21 | 18,690,750 | 6,230,250 | 623,025 | 207,675 |

For maximum flexibility in the implementation of key transmission channel 34 (FIG. 1), it is advantageous to reduce the number of bytes for key 50 data storage, while at the same time using a sufficient number of keys 50 to provide the desired level of security for the data stream. For example, in order to provide encryption keys 50 on a smart card, the amount of data must be, typically, less than 8 KBytes. Thus it can be seen that there would be advantages in an alternate approach for providing key synchronization that uses data storage space efficiently. Such an approach, as used in the present invention, will be described subsequently.

Additional overhead bits, not included in the computations of Table 1, could also be required to support key mapping with each type of encryption algorithm used.

It is instructive to note that there may be preferred algorithms other than the DES or Triple-DES algorithms as listed in Table 1. Due, for example, to export constraints, it may be advantageous to employ an alternate algorithm or algorithms for encryption. Less secure algorithms could be used, for example, particularly if other compensating security measures were taken. As an example strategy, using a larger number of keys 50 could compensate, to some degree, for using a less secure algorithm than DES or Triple-DES encryption.

Key 50 Delivery Structure

It can be appreciated that it would be beneficial to make the key synchronization indices as compact as possible for efficient and flexible data transfer. With this end in mind, the present invention provides the data structure shown in FIG. 6 for a key file 70. With reference again to FIG. 1, key file 70 delivers encryption keys 50 and key synchronization index data from data origination site 12 to data destination site 14.

Figure 6:
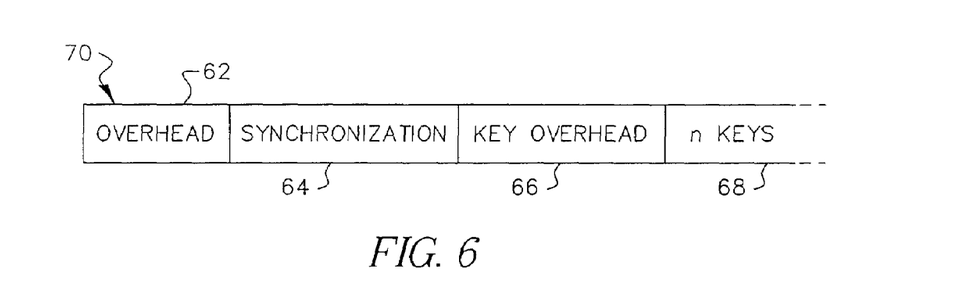
FIG. 6 shows an encryption key assignment structure for multiple keys, including synchronization data in accordance with the invention.

Using the structure of key file 70, a header field 62 contains general information about the data (such as name of the motion picture and theater) and specifies the encryption type. A synchronization field 64 contains synchronization index information used to link individual keys 50 to blocks 26 or, correspondingly, to frames 54. A key overhead field 66 provides information necessary for obtaining keys 50 from a keys field 68. Key overhead field 66 can also be used to indicate how keys 50 are arranged in keys field 68 or how blocks 26 are structured. Types of information in key overhead field 66 could include data on techniques used such as key interleaving, padding, or addition of dummy bits. Key overhead field 66 could alternately specify an algorithm used to locate a corresponding key 50 within key field 68. Key field 68 can contain any number of keys 50, constrained chiefly by file size and security requirements.

In the preferred embodiment, synchronization field 64 comprises m bits made up of two components ($m_1$, $m_2$). In order to provide synchronization index data, bits $m_1$ are used to specify the configuration of an LFSR (Linear Feedback Shift Register) for generating pseudo-random values (within decryption engine 38 and encryption engine 22), using techniques well-known in the data encoding arts. Bits $m_2$ provide a random number used as the seed for the LFSR. Using a value of $m_1+m_2=19+21=40$ bits, for example, 1,048,575 (computed as $2^{m_1+1}-1$) pseudo-random values for key synchronization can be generated using an LFSR. (As is known in the art of generating pseudo-random numbers, an LFSR that is ($m_1+1$) bits in dimension can be specified by a polynomial of degree ($m_1+1$) and may be represented by an $m_1$-bit binary number.) The pseudo-random values generated thereby can be used to provide an offset which is used in the key synchronization scheme described subsequently.

It is instructive to note that the efficient use of key file 70, as used in the present invention, greatly reduces the overhead requirements for synchronizing keys 50 to data blocks 26. For example, the approach illustrated in FIG. 6 utilizes only 40 bits of overhead to synchronize a number of keys 50 to data blocks 26. Thus, for example, 40 bits could be used to provide sufficient synchronization index data for an entire digital motion picture. Contrast this to the approach illustrated in FIG. 5 and Table 1, where 21 bits of synchronization index data are required as overhead for each encryption key 50.

Key Synchronization Scheme Using Key File 70

To provide key file 70 having a minimal size, yet capable of containing sufficient keys 50 for highly secure encryption of a data stream, a number of keys 50 is first calculated, based on overall size constraints imposed by key transmission channel 34 and by the security levels desired. For current smart card applications with memory capacity of approximately 8 K bytes, key file 70 can contain about 300 keys using the data structure arrangement of FIG. 6 (with Triple-DES encryption). Using the simplest approach in which keys 50 are not re-used, this means providing about 300 data blocks 26.

Figure 7:
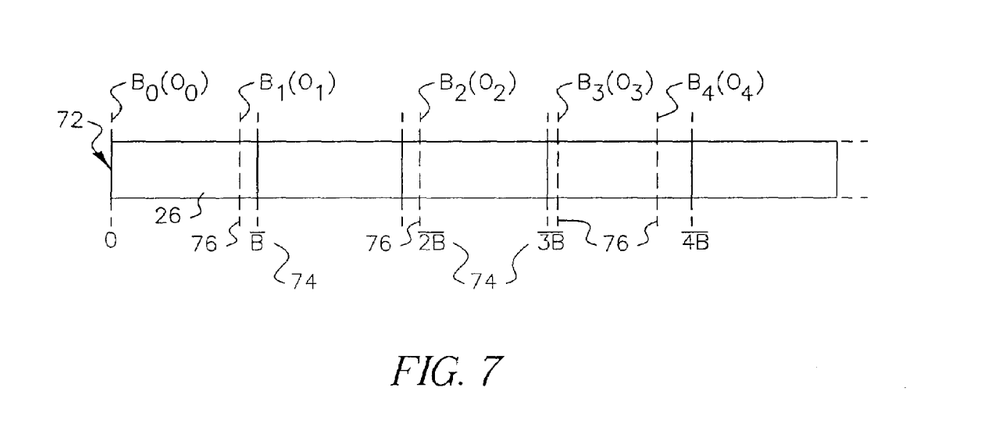
FIG. 7 shows use of a randomly generated offset value for encryption blocks in accordance with the invention.

The next step is to calculate the number of frames 54 (or frame 54 components) per encrypted data block 26. It would be feasible to divide the data stream into evenly-sized blocks 26 for encryption. This would simply require division of the total number of frames 54 by the total number of keys 50 (leaving one block 26 of different size to handle residual bytes). Using blocks 26 of the same size is a simple approach, but a more secure solution is to introduce some randomness in sizing blocks 26. Referring to FIG. 7, added security is provided by assigning a random offset 76, which causes encryption/decryption of a data stream 72 (in the preferred embodiment, data stream 72 being the motion picture data itself) with each key 50 to begin and end at frames 54 that are offset from evenly spaced block boundaries 74. As noted above, this provides an advantage for security, making it more difficult for an unauthorized recipient to determine where individual blocks 26 begin and end and thus to determine frame 54 correspondence to keys 50.

Before applying random offsets 76, it is first necessary to determine the average number of frames 54, $\bar{B}$, within each encryption block in order to determine block boundaries 74 within data stream 72. This is accomplished by dividing the total number of frames 54 (or the number of frame 54 components Y, Cr, Cb), M, by the total number of available encryption keys 50, N, and taking the floor function (which provides the integer value of the division and discards any fractional remainder):

$$\overline{B} = \left\lfloor \frac{\text{Total number of frames } (M)}{\text{Total number of encryption keys } (N)} \right\rfloor$$

This calculation provides the value for block boundaries 74 (as exemplified at points 0, $\overline{B}$, $2\overline{B}$, $3\overline{B}$, $4\overline{B}$, in FIG. 7).

Random offsets 76 ($O_i$ in FIG. 7, where i denotes a specific data block 26) are then computed using pseudo-random number generation (such as using a Linear Feedback Shift Register, for example). The random offset 76 is computed to satisfy:

$$\left( -\left\lfloor \frac{\overline{B}}{2} \right\rfloor \le O_i \le \left\lfloor \frac{\overline{B}}{2} \right\rfloor \right)$$

where ($1 \le i \le N$).

There can be practical reasons for limiting the amount of randomness, so that blocks 26 are suitably sized. For example, if block 26 sizing were completely random, some blocks 26 could contain only a few frames 54, others could contain a large number of frames 54. Such an arrangement would have inherent disadvantages. Discovery of key 50 for a large block 26 would allow decryption of a large portion of the data, for example. Discovery or "breaking" of key 50 for a small block 26 could be more easily performed, particularly if there were known image content in the small block 26. Therefore, the most practical approach appears to be to constrain the size of offset 76, as is expressed above, to keep blocks 26 sized appropriately.

It is instructive to note that the base unit for data block 26 depends on the type of data in data stream 72. For a digital motion picture, the most practical arrangement in the preferred embodiment is to use frame 54 as the base unit. This means that offset 76 would be applied and handled in units of frames 54. (While other arrangements are possible, frame-by-frame access to the digital motion picture data is needed.)

Generation of Key File 70

Referring again to FIG. 6, key file 70 comprises a keys field 68 that includes a key 50 for each encrypted data block 26. Synchronization field 64 can include a seed value for generation of random offset 76. Decryption engine 38 uses synchronization field 64 and the key 50 values in keys field 68 to create a table or matrix in memory that maps each key 50 to data block 26, including the corresponding random offset 76. Then, decryption engine 38 uses the data from memory in order to synchronize its decryption operation.

Key file 70 can be provided to each movie site on a smart card or other removable medium. Or, key file 70 can be securely transmitted to each site, such as using public key encryption. In any event, key file 70 is preferably encrypted, to provide additional security.

Figure 8:
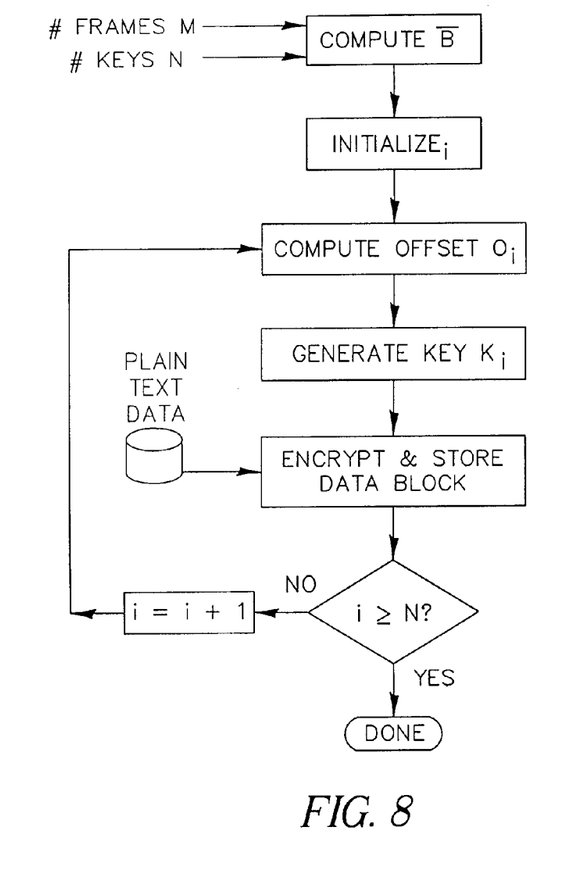
FIG. 8 shows a flow diagram representation of the overall process for data encryption and key generation in accordance with the invention; and, FIG. 9 is a schematic block diagram illustrating one process for key generation and synchronization using multiple data blocks in accordance with the invention.

Referring to FIG. 8, there is shown a flow diagram of the process performed at data origination site 12 for encryption of data stream 72 having multiple keys 50 with random offsets 76. In an initial step, the base block size $\overline{B}$ is first computed, given the capacity for number of keys 50 in key file 70 as is described above. Then, for each data block 26 of plaintext data, offset 76 and key 50 are computed. Data block 26 is encrypted and stored in distribution site storage apparatus 30. Key 50 and offset 76 data are stored temporarily and securely by key and synchronization generator 28. The process repeats until all of the plaintext data is encrypted. Then, key file 70 can be assembled by key and synchronization generator 28 from the stored keys 50 and the synchronization index data (that is, the LFSR configuration and initialization seed provided as described above). Data from storage apparatus 30 can then be recorded onto a recording medium or can be transmitted to data destination site 14.

While the invention has been described with particular reference to its preferred embodiments, it will be understood by those skilled in the art that various changes may be made and equivalents may be substituted for elements in the preferred embodiments without departing from the scope of the invention. For example, the file structure for key file 70 could be expanded to include additional information for decryption. For further security, keys 50 could be padded, such as with random bit values, or could be interleaved or arranged in some predetermined fashion within key file 70. Optionally, a separate means could be used for providing values used to generate random offset 76. Seed values for an LFSR, for example, could be provided in a separate file or be provided in a separate transmission, thus serving the role of another type of key for decryption. A memory device could alternately be provided with key or offset generation data, such as an RF ID component provided for reading at the data destination site.

Key file 70 need not be provided as a single file but could be advantageously provided split into pieces, with each piece separately encrypted and provided in a different form or over a different transmission channel.

While the detailed description above discloses use of the present invention for encryption of video components, a similar scheme could be used for decryption of accompanying audio data in the digital motion picture file.

The present invention can also be advantageously applied for real-time video/audio program viewing applications. For example, the data for key file 70 could be delivered or transmitted to data destination site 14 prior to transmission of a video/audio program. The live video/audio data stream could then be decrypted directly as the program data is received.

In a related embodiment, data blocks 26 could be provided in a non-sequential fashion for added security. Or, data transmission channel 32 could comprise parallel channels for transmission of data blocks 26, where individual parallel channels have a smaller bandwidth and are low-cost. Data blocks 26 could be transmitted in random sequence, to be reassembled in correct order at the destination site.

Therefore, what is provided is an apparatus and methods for encrypting and/or decrypting a data stream as a plurality of sequential data blocks, each block having an assigned encryption key and a method for securely synchronizing each encryption key with a corresponding data block.

Modifications and variations of the present invention are possible in light of the above teachings. It is therefore to be understood that within the scope of the claims the invention may be practiced otherwise than is specifically described.

PARTS LIST

10. Secure data stream transfer apparatus
12. Data origination site
14. Data destination site
16. Key extraction engine
18. Digital data source
20. Compression engine
22. Encryption engine 24. Frame or frame component ID
26. Data block
28. Key and synchronization generator
30. Distribution site storage apparatus
32. Data transmission channel
34. Key transmission channel
36. Destination site storage buffer
38. Decryption engine
40. Destination key and synchronization generator
42. Decompression engine
44. Data manipulation and formatting apparatus
46. Projector
48. Screen
50. Encryption key
52. Key mapping table
54. Frame
56. Start block ID field
58. Start component ID field
60. Data structure
62. Header field
64. Synchronization field
66. Key overhead field
68. Keys field
70. Key file
72. Data stream
74. Block boundaries
76. Random offset
78. Block synchronization transmission channel

What is claimed is:

1. A data transfer apparatus for secure transfer from a digital data source to a digital data receiver of a plurality of data blocks each data block comprising plural frames of a digital video image, the apparatus comprising:
   (a) an encryption key generator for providing encryption keys wherein a respective encryption key is assigned to each data block of the plurality of data blocks and a block synchronization index is provided indicating a correspondence between said encryption key and said data block, said block synchronization index is computed using a pseudo-random number generator;
   (b) an encryption engine that, for each said data block, produces an encrypted data block using said encryption key from said encryption key generator;
   (c) a data transmission channel for delivering said encrypted data block from said encryption engine to the digital data receiver;
   (d) a key transmission channel for delivering said encryption key from said encryption key generator to the digital data receiver;
   (e) a block synchronization data channel for delivering said block synchronization index from said encryption key generator to the digital data receiver;
   (f) a memory for storing the encryption keys at the digital data receiver; and
   (g) said digital data receiver including a decryption engine that is responsive to said synchronization index for mapping each key in a memory to a respective encrypted data block for use in decryption of the respective data block.

2. The apparatus of claim 1 wherein said encryption engine and decryption engine are provided with symmetric encryption.

3. The apparatus of claim 1 wherein the size of said data block is further conditioned by an offset value.

4. The apparatus of claim 1 wherein said data transmission channel is a wireless transmission network.

5. The apparatus of claim 1 wherein said data transmission channel utilizes dedicated phone service.

6. The apparatus of claim 1 wherein said data transmission channel utilizes a portable storage medium.

7. The apparatus of claim 1 wherein said data transmission channel utilizes a computer data network.

8. The apparatus of claim 1 wherein said data transmission channel utilizes a local area network.

9. The apparatus of claim 1 wherein said data transmission channel utilizes a wide area network.

10. The apparatus of claim 1 wherein said block synchronization data channel utilizes a smart card.

11. The apparatus of claim 1 wherein said block synchronization index is encrypted.

12. The apparatus of claim 1 wherein said block synchronization data channel utilizes a portable storage medium.

13. The apparatus of claim 1 wherein said key transmission channel utilizes a smart card.

14. The apparatus of claim 1 wherein said encryption key is encrypted.

15. The apparatus of claim 1 wherein said key transmission channel utilizes a portable storage medium.

16. The apparatus of claim 1 wherein said data block is compressed.

17. The apparatus of claim 1 wherein said pseudo-random number generator is a linear feedback shift register.

18. A method for secure transfer of a data stream from a digital data source to a digital data receiver, the method comprising:
   (a) partitioning the data stream into a plurality of successive data blocks, wherein the size of each successive data block is variable, based on an average size and based on a randomly generated offset;
   (b) generating, for each successive data block, an encryption key;
   (c) encrypting each said successive data block using said encryption key to provide an encrypted data block; and
   (d) generating a synchronization index associating said encrypted data block with said encryption key.

19. The method of claim 18 wherein the step of providing said encrypted data block comprises the step of recording said encrypted data block onto a recording medium.

20. The method of claim 19 wherein said recording medium uses a magnetic storage technology.

21. The method of claim 19 wherein said recording medium uses an optical storage technology.

22. The method of claim 18 wherein the step of providing said encrypted data block comprises the step of transmitting said encrypted data block to the digital data receiver.

23. The method of claim 18 further comprising the step of encrypting said encryption key.

24. The method of claim 18 further comprising the step of transmitting said encrypted data blocks to said receiver site in non-sequential order.

25. The method of claim 18 wherein said data stream comprises digital motion image data.

26. A method for mapping a plurality of encryption keys to a corresponding plurality of encrypted data blocks of a digital motion image, the method comprising:
   (a) providing said plurality of encryption keys separately from said encrypted data blocks and storing the encryption keys in a memory at a digital data receiver;
   (b) providing an identifier that correlates a mapping algorithm to said plurality of encryption keys;
   (c) operating a decryption engine that is responsive to said identifier and the mapping algorithm to generate each key for use in decryption of the respective data block;

wherein the encrypted data blocks comprise digital motion image data blocks and the digital motion image data blocks are decrypted by providing a digital motion image data frame or digital motion image data frame component identification; and generating a corresponding key from the plurality of encryption keys for use in decrypting the block of which the frame or frame component forms a part; and wherein a digital motion image data frame comprises plural color components and only data of one of the color components is encrypted.

27. The method of claim 26 wherein said plurality of encryption keys are interleaved in a non-sequential order.

28. The method of claim 26 further comprising the step of padding said plurality of encryption keys using dummy bits.

29. The method of claim 26 wherein each block is a digital motion image data frame component of a motion picture.

30. The method of claim 26 wherein each block is a digital motion image data frame of a motion picture.

31. The method of claim 26 wherein decryption of the encrypted data blocks is made in a digital motion image projector which projects images represented by the digital motion image data upon a screen.

32. The method of claim 26 wherein the digital motion image data blocks are compressed using an MPEG type of compression to form intra-coded stand alone frames and dependent P and B frames, and the intra-coded and P and B frames are encrypted.

33. The method of claim 26 wherein the color component that is encrypted is represented by a bit depth greater than one and only one bit plane of the color component data is encrypted.

34. A method of decrypting encrypted digital motion image data blocks of a motion picture comprising:

providing digital motion image data of a digital motion picture as digital motion image data blocks at least some of which digital motion image data blocks are of different sizes to provide at least some variability in terms of numbers of frames of said motion picture in said image data blocks;

in response to an index providing information identifying a first frame of each digital motion image data block generating a corresponding key from a plurality of encryption keys for use in decrypting a respective digital motion image data block wherein the said at least some digital motion image data blocks each represents plural frames of the motion picture; and wherein a digital motion image data frame comprises plural color components and the data of the color components are encrypted and further wherein each color component is represented by a bit depth greater than one and one or more bit planes but less than all bit planes of each color component data is encrypted.

35. The method of claim 34 wherein the decryption of the encrypted data blocks is made in a digital motion image projector which projects images represented by the digital motion image data upon a screen.

36. A method of decrypting encrypted digital motion image data blocks of a motion picture comprising:

providing digital motion image data of a digital motion picture as digital motion image data blocks, wherein a digital motion image data frame comprises plural color components and only data of one of the color components is encrypted; and generating a corresponding key from a plurality of encryption keys for use in decrypting a digital motion image data block that is encrypted.

37. The method of claim 36 wherein the data of the color component that is encrypted is represented by a bit depth greater than one and one or more bit planes but less than all bit planes of the color component data is encrypted.

38. The method of claim 34 wherein block boundaries are determined by computation of random offsets.

39. The method of claim 34 wherein indices providing correspondence information relative to encryption keys are provided in a channel separate from a channel providing ciphertext of the encrypted data blocks.

\* \* \* \* \*